12 Claims. (Cl. 121—7)

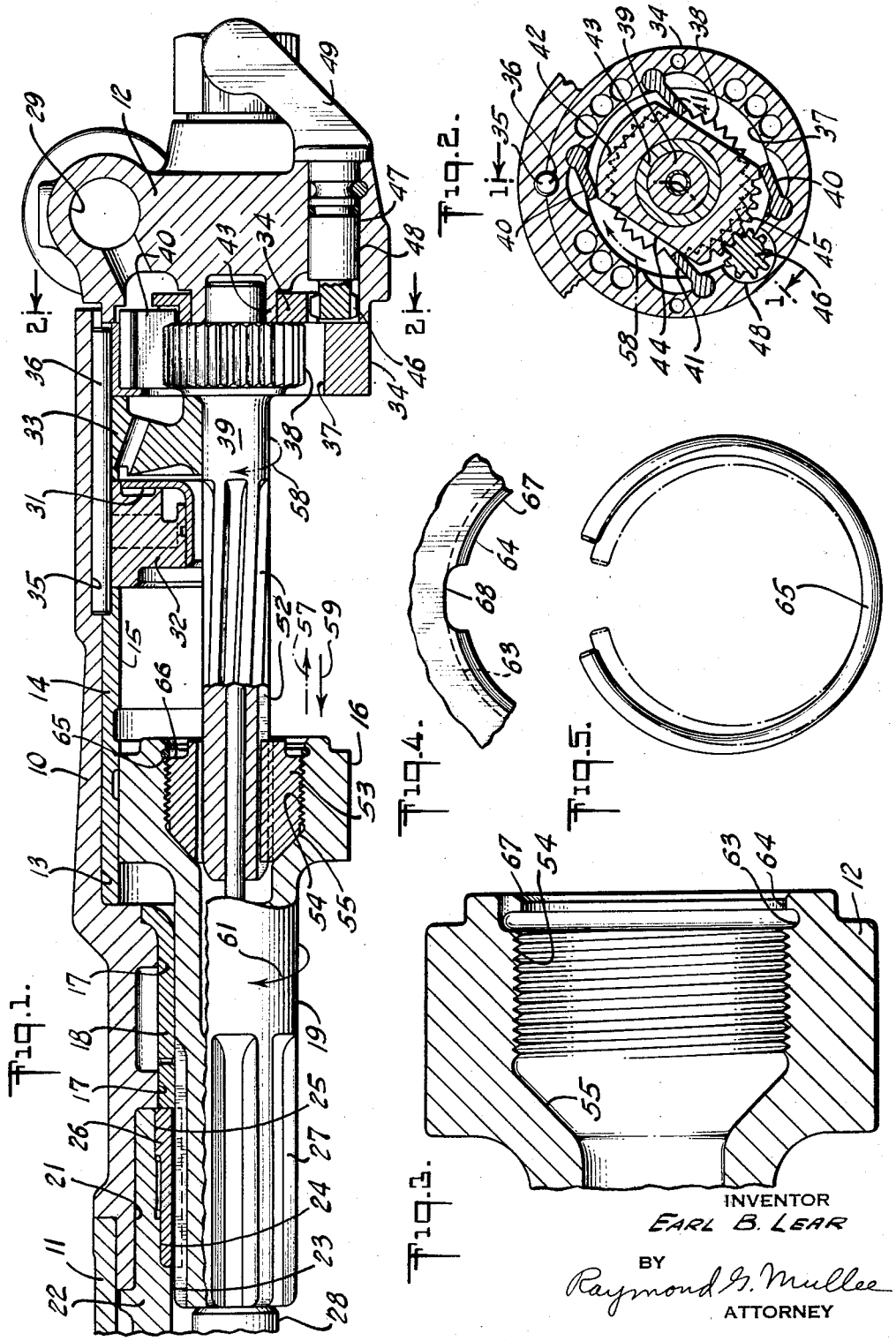
Oct. 27, 1959 — E. B. LEAR — 2,910,046
RIFLE NUT RETAINER FOR ROCK DRILL
Filed Oct. 7, 1957
INVENTOR
EARL B. LEAR
ATTORNEY ns
2,910,046
RIFLE NUT RETAINER FOR ROCK DRILL Earl B. Lear, Utica, N.Y., assignor to Chicago Pneumatic Tool Company, New York, N.Y., a corporation of New Jersey Application October 7, 1957, Serial No. 688,542

This invention relates to rock drills and more particularly to a rotation mechanism of the rifle bar type for converting the reciprocation of the hammer piston into intermittent uni-directional rotation.

In the usual rock drill, the rotation mechanism includes a rifle nut, threaded at its periphery for rigid attachment to a recess in the piston and having an inclined fluted bore to fit over a corresponding surface on the rifle bar, whereby reciprocation of the piston relative to the rifle bar is accompanied by relative oscillatory movement. A ratchet mechanism, interposed between the rifle bar and the backhead of the drill, permits the rifle bar to rotate freely in a counterclockwise direction during the forward or power stroke of the piston but locks the rifle bar against clockwise rotation, thereby compelling the rifle nut to rotate in a counterclockwise direction during the return movement or backstroke of the piston. As the rifle nut rotates it transmits torque through the piston, chuck nut, chuck sleeve and chuck to the drill steel, thus turning it to present a new alignment between the cutting edges of the drill steel and the rock on the succeeding hammer blow. The inclination of the splines and screw threads is such that when the piston rotates on the backstroke, the accompanying torsional force transmitted through the rifle nut is so directed that it tends to seat the nut more firmly against the bottom of the threaded recess.

In some applications, it is desirable to reverse the direction of rotation of the piston and associated drill steel. Such occasion may arise, for example, if the drill is used in deep holes where the drill steel or drill rod is made in a number of sections and it is desired to uncouple or loosen the sections with a combined rotary and hammering action. In a drill designed for this purpose, the ratchet mechanism is reversed so that the piston turns clockwise on the forward stroke. Upon such turning movement, the rifle nut is subjected to a torsional thrust and tends to loosen or back out of the piston.

An object of this invention is the provision of a reversible rotation mechanism for a rock drill which will prevent the rifle nut from backing out of the piston under all operating conditions, irrespective of the direction or rotation.

Another object is the provision of a retainer which will hold the rifle nut securely in seated position in the piston, notwithstanding vibratory and torsional forces tending to loosen or unscrew the nut.

A further object is the provision of a rifle nut retainer which is easy to assemble or disassemble but which will not allow the nut to become loosened or detached accidentally.

A feature of this invention is a split ring adapted to engage the rear end of the rifle nut and to expand into locking engagement with an annular groove provided in the piston adjacent the threaded portion of the recess which receives the rifle nut.

Other objects will appear more fully from the following description taken in connection with the accompanying drawings in which:

Fig. 1 is a fragmentary view of a rock drill embodying this invention, chiefly in longitudinal section, as indicated by the arrows 1 in Fig. 2;

Fig. 2 is a cross-section through the reversible pawls and control apparatus therefor, as indicated by the arrows 2 in Fig. 1;

Fig. 3 is an enlarged view in longitudinal section of the rear portion of the piston;

Fig. 4 is an enlarged fragmentary view in elevation of the rear face of the piston;

Fig. 5 is an enlarged detail view of the retainer ring, showing the latter in its disengaged condition in full lines and in operating condition in broken lines.

The illustrative rock drill, which is of the drifter type, includes a cylinder 10 adapted to be mounted for relative axial movement on a guide shell (not shown). The cylinder is secured by the usual through bolts (not shown) to a front head 11 and a back head 12. The cylinder has a main bore 13 which receives a sleeve 14. The sleeve is internally bored to provide a chamber 15 for a reciprocating piston 16. In front of the main bore, the cylinder has a reduced bore 17 in which a front bushing 18 is mounted with a press fit. The front bushing provides a rotating and sliding support for a cylindrical extension 19 on the piston 16. Extending forwardly from the bore 17 is a front counterbore 21 which provides a rotating support or bearing for a chuck sleeve 22. The chuck sleeve has a bore 23, an intermediate counterbore 24 and a rear counterbore 25. The two counterbores provide a rigid support for a chuck nut 26. The nut is secured to the chuck sleeve by means of a press fit within the counterbored portions and remains immovably seated against the front end of the intermediate counterbore 24 irrespective of the direction of the torsional forces between the chuck nut and the chuck sleeve. In this respect the present invention differs from conventional arrangements in which the chuck nut is screw threaded into the chuck sleeve and is secured against the bottom wall of the threaded recess only as long as there is no substantial torsional force in an unscrewing direction.

The front portion of the cylindrical extension 19 on the piston is interrupted by a series of longitudinal grooves 27 forming a splined arrangement fitting within a correspondingly splined or fluted opening in the chuck nut 26. The front extremity of the piston 16 projects into chuck sleeve bore 23 and delivers hammer blows to a drill steel 28. The piston also serves as a means for transmitting a step-by-step rotative movement through the splined connection 27, chuck nut 26, chuck sleeve 22 and the usual chuck (not shown) in which the drill steel is supported. The mechanism for rotating the piston will be described presently. Reciprocation of the piston is effected in the usual manner by live air admitted through a transverse bore 29 in the backhead 12, and directed alternately to the opposite ends of the piston chamber 15 by means of a distributing valve 31. The valve reciprocates between a front valve seat 32 and a rear valve seat 33. The valve seats are disposed in abutting relation with each other and with the cylinder sleeve 14 in the rear part of the main bore 13 of the cylinder 10. For a detailed description of the distributing valve and associated passages, reference is made to U.S. Patent 2,493,298, January 3, 1950.

The rotation mechanism, which converts reciprocation of the piston 16 into rotary movement thereof, includes a pawl carrier 34 supported within the main cylinder bore 13 in abutting engagement with the rear valve seat 33 and the backhead 12. In order to prevent rotation of the pawl carrier, the cylinder is provided with a longitudinal recess 35 (Figs. 1 and 2) to receive a dowel pin 36. A complementary recess is formed in the pawl carrier 34 and also in the valve seats 32 and 33 and sleeve 14, thus holding all of such parts in fixed assembled relation. The pawl carrier has an opening 37 generally of cylindrical shape and surrounding a toothed head 38 near the rear end of a rifle bar 39 which is disposed in axial alignment with the piston 16. The rear valve seat 33 and the backhead 12 provide bearings, which support the rifle bar for rotation, and abut against the front and rear sides respectively of the toothed head or ratchet 38 to hold the rifle bar against axial movement.

Adjacent the central opening 37 (Fig. 2), the pawl carrier 34 is recessed to provide pivotal supports for two supports for two oppositely inclined sets of pawls 40 and 41, the former being engageable with the toothed head 38 to lock the rifle bar 39 against clockwise direction (looking forward) and the other set being engageable with the toothed head to prevent counterclockwise rotation. Each pawl is urged inwardly at all times by suitable spring means (not shown). In order to release one set of pawls at a time for selective unidirectional rotation of the rifle bar, a pawl shifter 42 is provided. The pawl shifter has a cylindrical bore mounted for oscillatory movement on an annular boss 43 formed at the front end of the backhead. The pawl shifter has a pair of oppositely disposed recesses or flat sides 44 and has a pair of oppositely disposed peripheral portions, one of which provides a toothed sector 45. The latter meshes with a pinion 46 formed on the front end of a shaft 47 (Fig. 1) rotatably supported in a longitudinal bore 48 in the backhead 12. A control handle 49 projects from the rear end of shaft 47 beyond the backhead and provides a manipulative means for turning the shaft 47 and pinion 46 to turn the pawl shifter 42. When the latter is adjusted to the position shown in Fig. 2, the peripheral portions of the shifter engage the pawls 40 to release them from engagement with the toothed head 38, while the recessed or flat portions 44 accommodate the pawls 41 to permit them to move into locking engagement with the toothed head, with the result that the rifle bar 39 is capable of rotating in the clockwise direction only. Conversely, the rotation mechanism may be adjusted by turning the pinion 46 counterclockwise, causing the pawl shifter 42 to turn clockwise, to unlock the pawls 41 and effect engagement of pawls 40 to condition the rifle bar 39 for rotation in a counterclockwise direction only. The rotation mechanism may be controlled also by adjusting it to an intermediate position in which both sets of pawls 40 and 41 are disengaged from the toothed head 38, thus permitting the rifle bar 39 to oscillate freely.

Rifle bar 39 is provided with a series of inclined or helical grooves 52 starting near the distributing valve 31 and continuing to the front extremity of the rifle bar. The helical or rifling grooves receive correspondingly inclined splines formed on an internally fluted rifle nut 53 secured within a recess at the rear end of the piston 16. The rifle nut has a screw threaded connection 54 with the piston and is seated against a conical wall 55 in the piston. As usual, the rifling grooves 52 are right-handed with the result that forward movement of the piston must be accompanied by clockwise rotation of the rifle nut and piston and/or counterclockwise of the rifle bar, looking in a forward direction. Also as usual, the screw threads 54 are left handed with the result that the torsional thrust between the rifle bar and piston tends to tighten the nut 53 during the back stroke of the piston.

By manipulating the control handle 49, the operator may adjust the rotation mechanism for either counterclockwise or clockwise rotation. In the former condition, (not shown) the pawls 41 are swung outward and the pawls 40 engage the toothed head 38 on the rifle bar 39. During the forward stroke of the piston the rifle bar turns freely in a counterclockwise direction with the toothed head 38 slipping over the pawls 40. This movement is accompanied by very little torsional thrust between the piston and the rifle bar. During the backstroke of the piston, the pawls 40 lock the rifle bar 39 against clockwise rotation, and the rifle bar, due to the helical configuration of the grooves 52, compels the rifle nut 53 to turn counterclockwise, carrying with it the piston 16, chuck nut 26, chuck sleeve 22, chuck (not shown) and drill steel 28. The torsional thrust between the rifle bar and piston is then very considerable, due to the substantial mass and moment of inertia of the parts which are turned by the rotation mechanism, and also due to the frictional resistance encountered by drill steel 28, but this thrust is in a direction which tends to drive the nut 53 into tighter engagement with the inclined end wall or seat 55 in the piston 12. Rotation of the piston and drill steel in this manner is the usual arrangement and is known as "back-stroke rotation".

It is sometimes desirable to reverse the direction of the intermittent rotary movement imparted to the drill steel, for example in deep hole drilling when unscrewing one drill steel section from another. The arrangement here shown makes the reversal possible upon adjustment of the pawl shifter 42 to the position shown in Fig. 2, which will provide "front-stroke rotation". In this position of adjustment, the pawls 40 are disabled and the pawls 41 engage the toothed head 38 to permit the rifle bar to turn in a clockwise direction only. During the back stroke of the piston, represented by the broken straight arrow 57 in Fig. 1, the rifle bar 39 turns clockwise, as indicated by the broken curved arrows 58 in Figs. 1 and 2. During this backstroke movement, there is a slight torsional reaction between the piston and rifle bar which tends to tighten the rifle nut 53, but the torsional force is not substantial inasmuch as the toothed head 38 slips over the pawls 41. On the forward stroke of the piston, represented by the solid straight arrow 59 in Fig. 1, the rifle bar is immovable while the piston 16 is turned clockwise as indicated by the solid curved arrow 61 in Fig. 1. As in the case of back-stroke rotation, the turning movement of the piston and associated parts is accompanied by a considerable torsional thrust transmitted from the rifle bar through the rifle nut to the piston. In the case of front-stroke rotation, however, the heavy torsional thrust is in a direction tending to unscrew the rifle nut 53 from the threaded recess 54 in the piston. Since the intermittent unscrewing forces predominate over the intermittent tightening forces, the result may be, in the absence of special retaining apparatus, to loosen the rifle nut from the piston and make it necessary to stop the operation and disassemble the rock drill for repairs.

The present invention provides a retainer arrangement for preventing the rifle nut from becoming accidentally detached from, or loosened within, the recess in the piston. It comprises an annular groove 63 (Figs. 3 and 4) lying adjacent the front end of the screw threads 54 and separated from the front extremity of the piston by a thin circumferential lip or flange 64. A split ring 65 (Fig. 5) is so constructed that when compressed from its unrestrained condition shown in full lines to the size shown in broken lines in Fig. 5, it will fit the annular groove 63. The rifle nut 53 has a rear face or shoulder 66 adapted to lie adjacent the front edge of recess 63, when the nut is fully seated against the end wall 55 in the piston. With the nut in this position, the ring 65 is clasped by any suitable tool such as a pair of pliers and is compressed to a diameter somewhat less than the one shown in broken lines (Fig. 5), and is then moved within the lip 64 to the recess 63, and then is allowed to expand into the recess with a snap action. To facilitate assembly, the front face of the lip 64 may be provided with a conical surface or chamfer 67 arranged to contract the ring to its minimum size upon axial pressure of the ring against the chamfer 67. The lip 64 is provided with a recess or cut-away portion 68 having a maximum depth in a radial direction equal to that of the annular groove 63. The recess 68 permits the reception of a suitable tool, such as a screw driver (not shown), between the periphery of the retaining ring 65 and the surrounding part of the annular groove 63. The ring may be swivelled or turned about the axis of the piston 12 so that the screwdriver may engage the ring at a point near one of its ends and thus pry the end loose from the piston 12 whenever it is desired to disassemble the rifle nut 53.

From the foregoing description, it is seen that the invention provides a secure retainer arrangement for a rifle nut, because when the drill is adjusted for back-stroke rotation (in a counterclockwise direction) the preponderance of torsional forces engages the rifle nut 53 more tightly against the inclined front wall 55, whereas when the drill is adjusted for front-stroke rotation (in a clockwise direction) the preponderance of torsional forces engages the rear face 66 of the rifle nut against the retaining ring 65 and prevents any relative movement between the rifle nut and the piston. It is seen also that the invention permits convenient removal and replacement of the rifle nut when done intentionally, but not accidentally.

What is claimed is:

1. A rock drill comprising a reciprocating hammer piston having a recess formed therein, a rifle nut mounted in said recess, the interior of the rifle nut being fluted to provide intermittent oppositely directed torsional forces transmitted through the rifle nut to the piston, the rifle nut and piston having engaging faces to positively limit movement of the nut relative to the piston in response to such torsional forces in one direction, and a retainer supported by the piston and arranged to positively limit or prevent movement of the rifle nut relative to the piston in response to torsional forces in the opposite direction, said piston having an annular groove extending radially outward from the recess, said retainer being securely mounted in said groove and projecting inwardly beyond the groove into the recess and engageable with the front face or shoulder on the rifle nut.

2. A rock drill comprising a reciprocating hammer piston, a recess formed in the rear end of the piston, a rifle nut secured in said recess by a screw threaded connection directly with the piston, the interior of the rifle nut being fluted to provide intermittent torsional forces transmitted through the rifle nut to the piston, the rifle nut having a front face engaging a seat in the recess to positively limit movement of the nut relative to the piston in a tightening direction, and a retainer supported by the piston and engaging a rear face or shoulder on the rifle nut to positively limit or prevent movement of the nut relative to the piston in response to torsional forces in a loosening direction.

3. A rock drill according to claim 2, in which the piston has an annular groove extending outwardly from the recess and in which the retainer is securely mounted in said groove, said retainer projecting inwardly beyond the groove into the recess and engageable with the front face or shoulder on the rifle nut.

4. A rock drill according to claim 3, in which the retainer comprises a ring snugly fitting the circumferential groove.

5. A rock drill according to claim 4, in which the ring is split and has a normal diameter when disassembled in excess of the diameter of the annular groove, whereby the ring tends to expand outwardly against the peripheral portion of the annular groove with a snap action.

6. A rock drill according to claim 4, in which the annular groove is separated from the rear end of the piston by a circumferential lip or retaining flange, a part of the lip being cut away to permit the reception of a tool to the peripheral portion of the annular groove for removing the retainer ring.

7. A rock drill according to claim 6, in which the ring is split and is adapted to be swivelly mounted in the annular groove to permit one end portion of the ring to become aligned with the cut-away portion of the lip.

8. A rock drill according to claim 6, in which the front face of the annular lip is chamfered to provide a means for compressing the ring upon axial pressure of the ring directed against the rear face of the piston to facilitate assembly of the ring.

9. A rock drill comprising a cylinder providing a piston chamber, a hammer piston reciprocable in said chamber, a rifle bar projecting into the piston and supported against axial movement relative to the cylinder, a rifle nut having a helically fluted connection with the rifle bar and mounted in a recess in the piston, reversible pawl and ratchet mechanism interposed between the rifle bar and cylinder for selectively permitting rotation of the rifle bar in one direction while preventing rotation thereof in the opposite direction, thereby effecting a step by step rotary movement of the piston in the selected direction, positive means for preventing rotary movement of the rifle nut relative to the piston in response to torsional impulses transmitted from the rifle bar through the nut to the piston in one direction, and positive means for preventing movement of the rifle nut relative to the piston in the opposite direction in response to such torsional impulses in the opposite direction, the last named positive means including a retainer detachably supported by the piston and engaging a shoulder formed on the rifle nut.

10. A rock drill according to claim 9, in which the reversible pawl and ratchet mechanism includes a toothed head or ratchet carried by the rifle bar, a set of pawls engaging the toothed head to prevent clockwise rotation of the rifle bar, a second set of pawls engaging the toothed head to prevent counterclockwise rotation of the rifle bar, a pawl shifter, manipulative means selectively moving the pawl shifter between two extreme positions, said pawl shifter being arranged to disengage the first set of pawls when in one extreme position and to disengage the second set of pawls when in the other extreme position and to disengage both sets of pawls when in an intermediate position.

11. A rock drill according to claim 9, which includes a chuck nut slidably connected to the piston and arranged to transmit torsional forces in opposite directions to a chuck sleeve, the chuck nut being immovably connected to the chuck sleeve by a press fit.

12. A rock drill comprising a cylinder providing a piston chamber, a hammer piston reciprocable in said chamber, a rifle bar projecting into the piston and supported against axial movement relative to the cylinder, a rifle nut having a helically fluted connection with the rifle bar to connect relative reciprocating to relative oscillatory motion, said rifle nut having external screw threads and mounted in a threaded recess in the piston, pawl and ratchet mechanism interposed between the rifle bar and cylinder for preventing rotation of the rifle bar in a counterclockwise direction thereby intermittently transmitting torsional impulses from the rifle bar through the rifle nut to the piston in a direction tending to unscrew the rifle nut, and positive means for preventing rotary movement of the rifle nut relative to the piston in response to such torsional impulses, said positive means including a snap ring detachably supported by the piston and engaging a shoulder formed on the rifle nut.

References Cited in the file of this patent

UNITED STATES PATENTS

| | | |
|---|---|---|
| 2,048,958 | Terry | July 18, 1936 |
| 2,461,527 | Curtis et al. | Feb. 15, 1949 |